United States Patent [19]
Puckett

[11] 3,722,904
[45] Mar. 27, 1973

[54] FOLDABLE WHEELBARROW

[76] Inventor: Lloyd S. Puckett, 2127 East Hamlin Street, Seattle, Wash. 98102

[22] Filed: Dec. 13, 1971

[21] Appl. No.: 207,199

[52] U.S. Cl. ............................. 280/36 R, 280/47.31
[51] Int. Cl. ............................................. B62b 1/20
[58] Field of Search .......... 280/36 R, 42, 47.3, 47.31, 280/47.32, 78; 220/4, 6, 7

[56] References Cited

UNITED STATES PATENTS

| | | |
|---|---|---|
| 3,552,760 | 1/1971 | Sine .................................... 280/36 R |
| 2,800,335 | 7/1957 | Clapp ................................. 280/47.31 |
| 3,565,453 | 2/1971 | Del Raso ............................ 280/47.31 |
| 2,471,462 | 5/1949 | Toth ................................... 280/47.31 |

Primary Examiner—Leo Friaglia
Assistant Examiner—Robert R. Song
Attorney—Nicolaas Devogel

[57] ABSTRACT

A wheelbarrow adapted to having its wheel, legs and handles foldable underneath its container center base and its container side sections foldable and enclosing about the folded wheel, legs and handles so that a substantial elongated box shape can be formed for compact safe storage and handling purposes.

8 Claims, 8 Drawing Figures

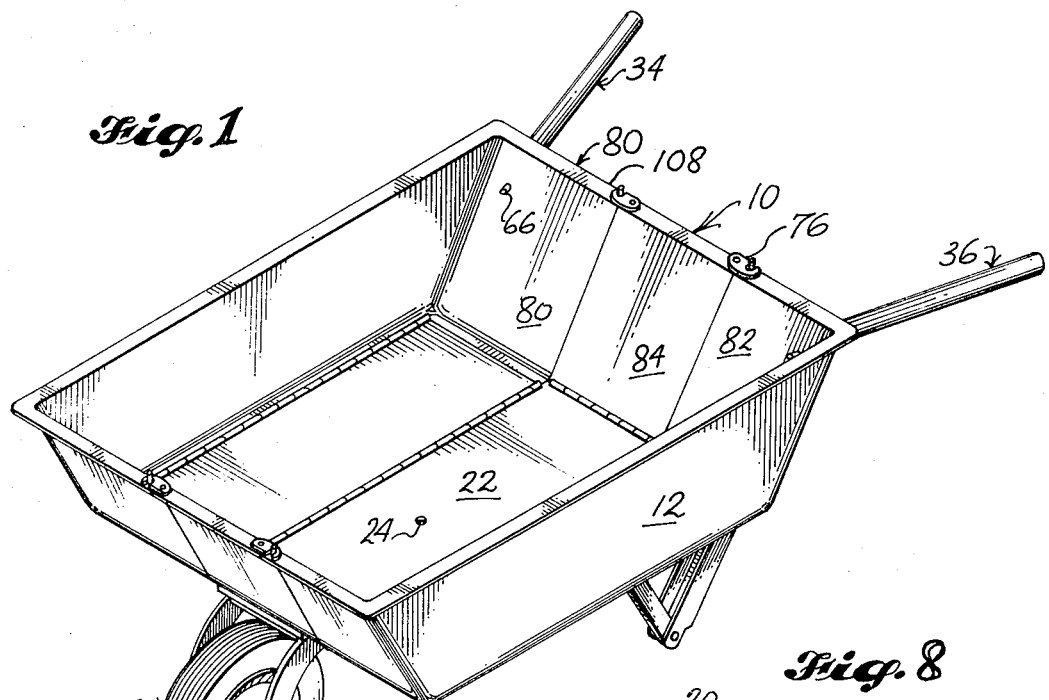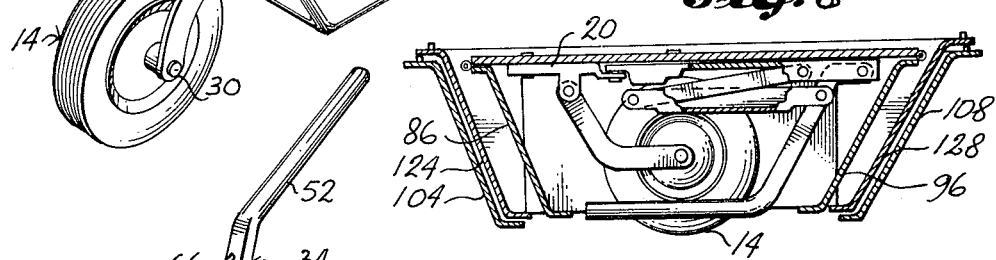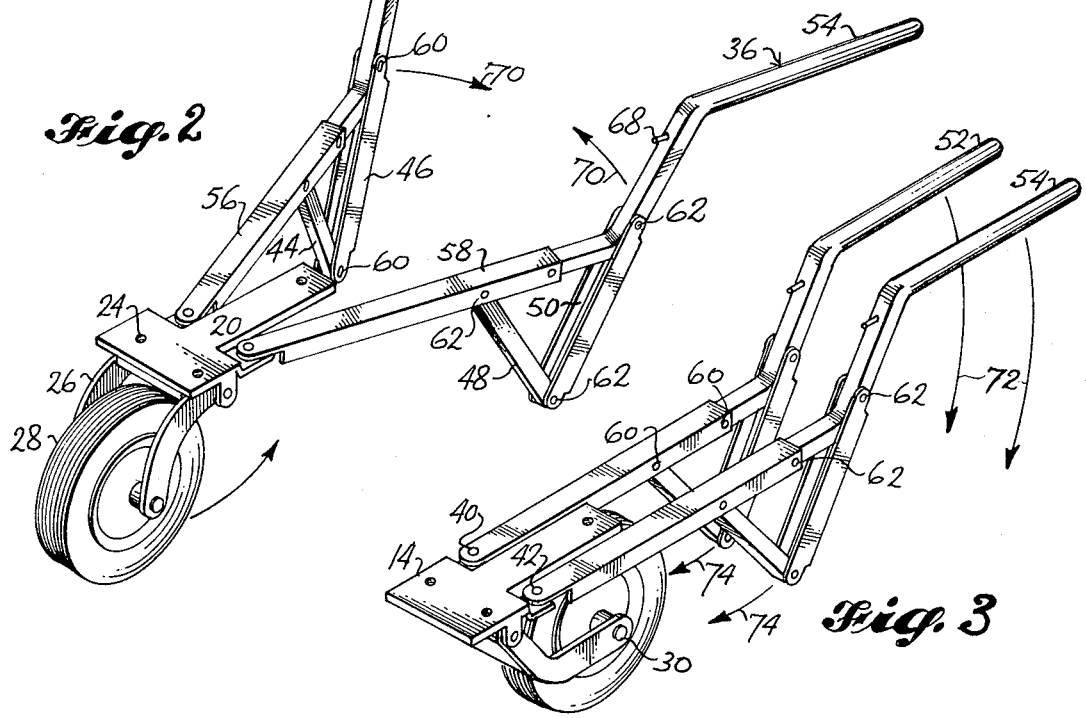

PATENTED MAR 27 1973 3,722,904
SHEET 2 OF 2
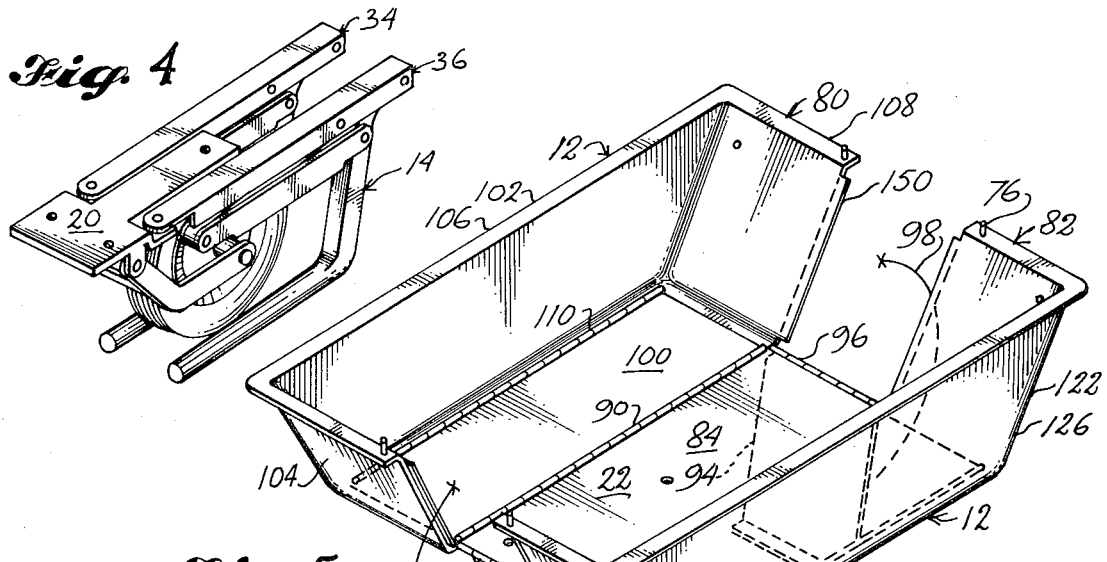
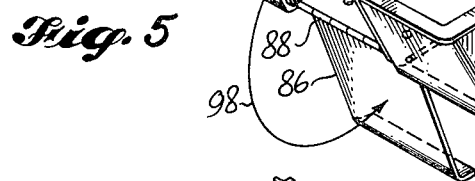
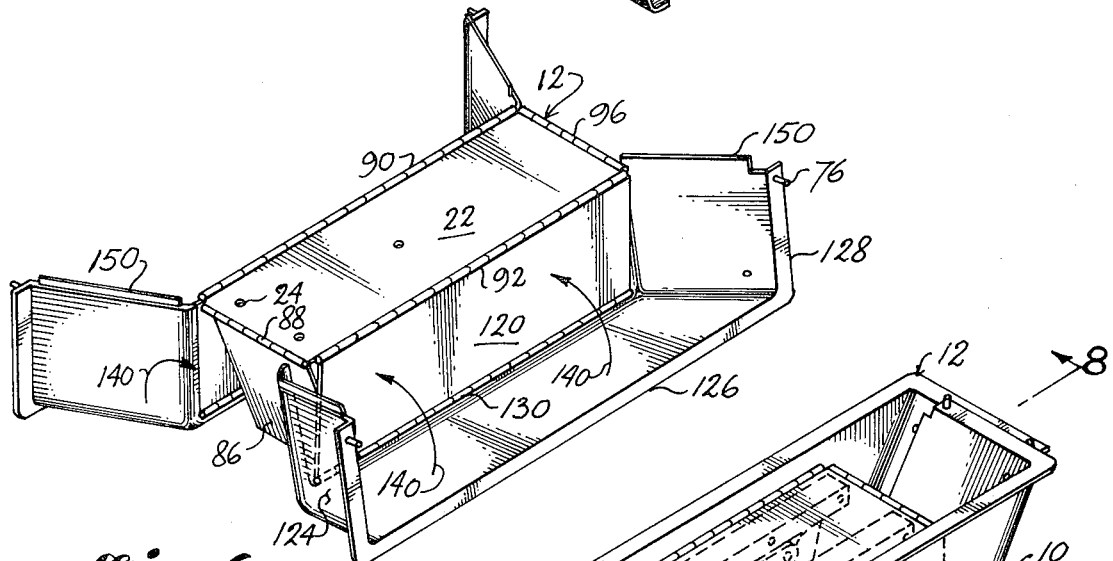
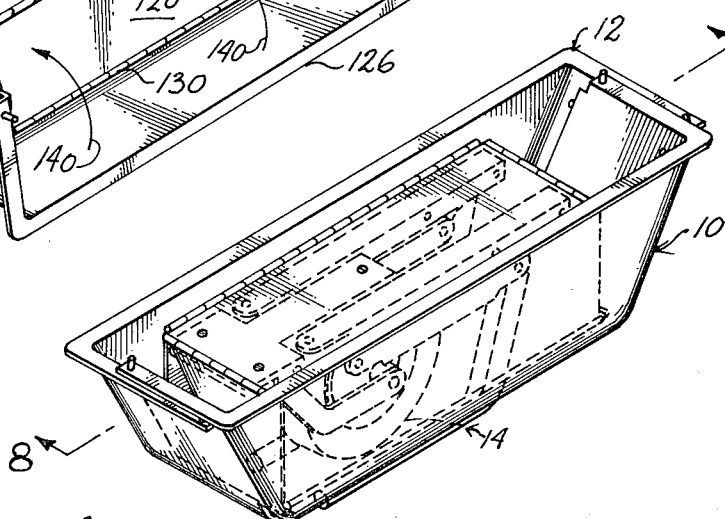

FOLDABLE WHEELBARROW

BACKGROUND OF THE INVENTION

1. Field

This invention relates to wheelbarrows, and, more particularly, to a one-part wheelbarrow that is foldable into an elongated box shape.

2. Description of the Prior Art

A thorough search in the literature as well as in the patent field disclosed a variety of foldable wheelbarrows. The most noteworthy patents issued were United States Pat. Nos. 2,422,331 by Bates; 2,471,462 by Toth; 2,800,335 by Clapp, and 3,565,453 by Del Raso. However, none of these and other concepts provides a foldable wheelbarrow that converts into a rectangular box shape without any protruding elements and which comprises one part only.

Most of the prior art devices needed demounting steps whereby tools had to be used and several parts were left over or stored together.

All of the prior art devices when folded had protruding ends, such as sharp wheel axles, handle bars and legs.

None of the prior art foldable wheelbarrows are capable of reducing their actual height, length and width to a folded-up version of, roughly, one-twelfth of the over-all size.

Finally, the end result of prior art foldable wheelbarrows cannot compare with the substantially rectangular box shape that is produced by applicant's invention, and which offers easy and convenient storage with safety and space-saving features.

In particular, the present invention has a potential use in campers, trailers, apartment living, as a toy, and in emergency and military operation, etc.

SUMMARY OF THE INVENTION

The present invention provides for simple, compact storage, transportation, handling and packing. Also, its foldable features into the unbelievable almost rectangular box shape while still maintaining a strong, sturdy, heavy-duty wheelbarrow in its unfolded condition, provides advantages for commercial operations, expedition, air drop, navy and army uses.

In short, the foldable wheelbarrow is a one-part assembled item which has pivots, hinges, latches and stop means for the folding and unfolding manipulations.

The basic design has an undercarriage which includes a wheel mounted for rotation on a fork and a foldable leg and handle assembly. The wheel, leg and handle fold all together with one another in order to take the least amount of space. Thus, the extruding and clumsy parts are out of the way when the container or the carrier means of the wheelbarrow is being folded.

Since the container basically comprises flat parts all hinged together, the folding up is accomplished by draping the flat parts about the prior mentioned clumsy items by zigzag folding the base portions with their sides into a box-type configuration.

The end result shows that the box outside surfaces are mainly outside container surfaces at the side, and the top of the box is mostly part of the center portion of the container-carrying base. Thus, there are no extruding parts, just flat surfaces, so that a plurality of wheelbarrows can be stored in a minimum space on top of one another and side by side, like blocks, or transported in normal carton boxes or the like. No tools or parts are left over; thus, the whole wheelbarrow is one item, including the latches, axle, pins and other small mounted-on hardware.

Assuming that the standard length of a wheelbarrow totals the length of the container plus equal length of the handle bar, the folded version by folding the handle bar under the container reduces the length by one-half. Since the container width is folded into three parts, the reduction becomes $1/3 \times 1/2 = 1/6$. Further, since the height of the wheelbarrow is twice that of the folded box, because the wheel disappears into the folded box, the reduction becomes $1/3 \times 1/2 \times 1/2 = 1/12$ of the total unfolded wheelbarrow volume version.

It is therefore an object of the present invention to provide for a foldable wheelbarrow made out of one assembly of parts or components which are interlocked with one another in the unfolded state to form a sturdy, heavy-duty wheelbarrow, and which components can be unlocked and folded into a substantially rectangular box.

It is another object of the present invention to provide for an improvement in foldable wheelbarrows whereby the foldable state takes about one-twelfth of the unfolded outside dimensional volume.

It is furthermore an important object of the present invention to provide for a method of folding or unfolding a wheelbarrow by a series of steps into a box shape.

The most important object of the present invention is to provide for a wheelbarrow that can be uniquely folded into a rectangularly shaped box configuration through simple steps and which utility besides that of the wheelbarrow offers advantages in space saving, storing, safety and packaging transportation in all fields where wheelbarrows are needed.

Briefly stated, the wheelbarrow in accordance with the present invention comprises a horizontally disposed base member with a fork carrying a rotationally mounted barrow support wheel that is pivotally mounted to the base, and a pair of foldable handle-leg assemblies which are pivotally mounted to the same base. A container or segmented carrying means comprising a right, a left and a center portion is integrally mounted to the base by the center portion and that center portion has a hingedly mounted forward center section and a rear center section, the left and the right portion each having an upstanding integrally connected forward, side and rear wall hingedly mounted to a left and a right base, respectively. Upon folding, the wheelbarrow is adapted for folding successively the fork underneath the base, the handle-leg assemblies next to each side of the folded fork and thereafter the forward center section, the rearward center section and the left and the right base downward from the center base. Now the left and right portion upstanding side walls are positioned surface to surface against the folded left and right base so that a substantially rectangularly shaped box is formed by telescoping or sliding the left and right portions into one another, thereby enveloping all prior mentioned components.

Other objects and various advantages of the disclosed invention will become apparent from the following detailed description together with the accompanying drawings submitted for purposes of illustration only and not intended to define the scope of the invention,

DESCRIPTION OF THE DRAWINGS

The drawings diagrammatically illustrate by way of example, not by way of limitation, one preferred embodiment of the invention, and like reference numerals are used for designating corresponding parts in the several views. Accordingly:

FIG. 1 is a perspective view of the foldable wheelbarrow as made in accordance with the hereinafter-described invention.

FIG. 2 is a perspective view of the undercarriage of the foldable wheelbarrow.

FIG. 3 is a perspective view of the undercarriage after the first folding step has been performed and the handle and leg assemblies are folded together.

FIG. 4 is a perspective view of the undercarriage after the second and third folding step has been performed whereby the handles and legs are folded next to the under base pivoted wheel.

FIG. 5 is a perspective view of the container of the foldable wheelbarrow after the fourth step has been performed of folding downward the forward center section and rear center section.

FIG. 6 is a perspective view of the container after the fifth step has been performed of folding the right portion right base and the left portion left base downward from the center base portion.

FIG. 7 is a perspective see-through view of the foldable wheelbarrow in its final folded condition after the sixth step of folding is performed by enveloping all folded components through telescoping the right and left portions into one another so that a substantially rectangularly shaped box-type configuration is made.

FIG. 8 is a sectional view taken from FIG. 7 along line 8—8.

DESCRIPTION AND OPERATION OF THE INVENTION

The invention, the scope of which is defined in the appended claims, is not limited in its application to the details of construction and arrangements of parts shown and described, since the invention is capable of other embodiments and of being practiced or carried out in various other ways. Also, it is to be understood that the phraseology or terminology employed herein is for the purpose of description and not limitation.

Referring to FIG. 1, there is shown a wheelbarrow 10 having a container 12 and a carriage assembly 14. The container 12 and carriage 14 are separately illustrated in FIGS. 5-6 and FIGS. 2-4, respectively. However, in reality the wheelbarrow comprises a one-part item, as shown in FIGS. 1, 7 and 8. By separately illustrating the container part 12 from the carriage assembly 14, the cooperation of the components of the one-part wheelbarrow 10 as well as all the various successive steps of folding or unfolding become more visible and clearer in explanation. It should be understood, however, that the base 20 of the carriage assembly 14 is integrally connected to the center base 22 of the container 12 and may be made from one component or two components 20 and 22 mounted together by mounting means such as fasteners 24 or the like. Most likely for ease of manufacturing and simplicity the wheelbarrow 10 is constructed as per illustrations.

Referring to FIG. 2, the base 20 has in front a pivotally mounted fork 26 that carries a support wheel 28 mounted on a substantially horizontal transverse axle 30 for rotation between said fork member 26 ends. Furthermore, a right and a left foldable handle and leg assembly 34 and 36 are respectively mounted for pivoting horizontally about a vertical axis or pivot points 40 and 42. Each handle and leg assembly 34 and 36 comprises four linkages which form a leg 44-46, 48-50, handle 52-54 and container support 56-58, respectively. The four linkages of each assembly 34 and 36 are pivotally mounted with one another by pivot means 60 and 62, respectively. As shown in FIG. 2, the folding step requires the bringing together of the handle-leg assemblies according to arrows 70, and the folding into a compact configuration as shown in FIG. 4 requires the disengagement of holding pins 66 and 68 from the container 12 and movement of handles downward and legs inward as per arrows 72 and 74, successively.

Proceeding further, the next folding step requires the unlatching of the latches 76 which are shown in FIG. 1. Now, the segmented container or carrying means 12 comprises a right portion 80, a left portion 82 and a center portion 84 which by the unlatching of latches 76 become movable to one another by their interconnected hinges 90 and 92. The center portion 84 has a forward center section 86 mounted by hinge means 88 and a rear center section 94 hingedly attached by hinge 96. According to FIG. 5, arrows 98 both forward 86 and rear center section 94 are swung underneath base 20-22 and thus shield the folded carriage assembly 14, as is shown in FIG. 8 at the front and rear.

The right portion 80 has a right base 100 and hingedly connected an upstanding wall 102 which includes an integrally connected forward wall 104, side wall 106 and rear wall 108. The side wall 106 is connected by a hinge 110 to the right base 100.

The left portion 82 has a left base 120 and hingedly connected an upstanding wall 122 forming an integrally connected forward wall 124, side wall 126 and rear wall 128. The side wall 126 is connected by a hinge 130 to the left base 120.

Thus, upon folding of the container 12 right and left portions 80 and 82, the right base 100 and left base 120 is turned downward with respect to the base 22, and thereafter the right upstanding wall 102 and left upstanding wall 122 is folded inward as per arrows 140 so that the right base 100 is against the side wall 106, surface to surface, and the left base 120 is against the left side wall 126, surface to surface.

Since the right portion 80 is slightly longer at each end than the left portion 82, the right forward wall 104 and rear wall 108 slide over and outside of the left forward wall 124 and left rear wall 128, or, in other words, left portion 82 telescopes or slides into right portion 80, thereby enveloping all the prior folded components of the wheelbarrow 10, as per illustration of FIG. 7.

In order that a clear realization of the position of each component can be obtained, a section view 8—8 taken along line 8—8 of FIG. 7 will be of assistance and helpful to the person familiar to the art of manufacturing foldable concepts. Of course, the slanted sides of the container at the front and rear may be less slanted which then would produce a true rectangularly shaped box upon folding.

Furthermore, and as shown by the illustrations, the upstanding edges 150 of the right front wall 104 and forward center section 86 complement in a closed multi-surface abutting relationship by means of tongue and groove or by flange means 150, and the same applies between the left front wall 124 and the forward center section 86, as well as between the right rear wall 108 and the rear center section 94 edge, and the left rear wall 128 and the rear center section 94.

Also, the latches 76 which hold the portions 80–82 and 84 together in proper alignment, as well as the pins 66–68 which locate the correct position of the linkages 56 and 58 for the purposes of container support and for handle positioning, can be modified and/or improved.

Accordingly, other forms and modifications of the present invention, both with respect to its general arrangements and the details of its several parts, which may become obvious to those skilled in the art, after a reading of the foregoing specification in the light of the accompanying drawings, are intended to come within the scope and spirit of the present invention, as more particularly defined in the appended claims.

Now, therefore, I claim:

1. A folding wheelbarrow comprising:
  a. a main base;
  b. a wheel support means pivotally mounted about a transverse horizontal axis to said base;
  c. a pair of foldable handle and leg assemblies pivotally mounted about laterally spaced vertical axes to said main base;
  d. a carrying means mounted on said base;
  e. said carrying means having a right and left base portion hingedly connected to said main base, each said base portion having a hingedly connected upstanding wall;
  f. said base having a hingedly connected upstanding forward section and rear section;
  g. said right and said left upstanding walls complementing with said forward and said rear section to form an enclosed upstanding wall to said container means and adapted to fold downward next to said main base, thereby enclosing said wheel support means and said handle and leg assembly means when said wheel support means and said handle and leg means are folded about their respective pivotal mounting means.

2. A foldable wheelbarrow as claimed in claim 1 wherein said pivotally mounted wheel support means comprises
  a. a fork member hingedly mounted to said base for pivoting about said transverse horizontal axis;
  b. said fork member having a pair of ends;
  c. journal axle means mounted at said ends, and
  d. a wheel carried by said journal means for rotation and support of said wheelbarrow.

3. A foldable wheelbarrow as claimed in claim 2 wherein each said handle-leg assembly comprises:
  a. a container support linkage mounted for pivoting about respective one said vertical axes at one end and having an intermediate first pivot means and a second pivot means at said container support linkage other end;
  b. a handle linkage having handle means at one end, a third intermediate pivot means and connected pivotally to said second pivot means of said container support linkage at its other end;
  c. a first and a second leg support linkage connected to one another end by a fourth pivot means and said first leg support linkage other end pivotally connected to said container support linkage first pivot means and said second leg support other end pivotally connected to said handle linkage third pivot means, whereby upon folding of said handle-leg assembly said first, second, third and fourth pivot means pivot about horizontal axes and said second and fourth pivot means move away from one another.

4. A foldable wheelbarrow comprising:
  a. a horizontally disposed base member;
  b. a fork, carrying a rotationally mounted barrow support wheel, pivotally mounted to said base about a transverse horizontal axis;
  c. a pair of foldable handle-leg assemblies pivotally mounted to said base about laterally spaced vertical axes;
  d. a segmented carrying means comprising a right, a left and a center portion;
    1. said center portion being coincident and integral with said base and having a hingedly mounted forward center section and a rear center section;
    2. said left and said right portion each having an upstanding wall, hingedly mounted to a left and a right base, respectively;
    3. said right and said left upstanding wall including in series an integrally connected forward wall, side wall and rear wall, respectively;
  e. said left and said right base hingedly mounted to said center portion base left and right side, respectively, and
  f. whereby upon folding of said wheelbarrow, successively said fork with wheel is adapted to fold underneath said base, said handle-leg assemblies next to each side of said folded fork and, thereafter, said forward center section, said rearward center section, said left and said right base downward from said center base, said left and right portion upstanding walls against said down folded left and right base so that said left portion telescopes into said right portion and a substantially rectangularly shaped box is formed.

5. A foldable wheelbarrow as claimed in claim 4 wherein about a horizontally extended axis:
  a. said fork member having a pair of ends;
  b. journal axle means mounted at said ends, and
  c. a wheel carried by said journal means for rotation and support of said wheelbarrow.

6. A foldable wheelbarrow as claimed in claim 5 wherein each said handle-leg assembly comprises:
  a. a container support linkage mounted for pivoting about respective one of said vertical axes at one end and having an intermediate first pivot means and a second pivot at said container support linkage other end;
  b. a handle linkage having handle means at one end, a third intermediate pivot means and connected pivotally to said second pivot means of said container support linkage at its other end;
  c. a first and a second leg support linkage connected to one another end by a fourth pivot means and said first leg support linkage other end pivotally connected to said container support linkage second pivot means and said second leg support other end pivotally connected to said handle linkage third pivot means, whereby upon folding of said handle-leg assembly said first, second, third and fourth pivot means pivot about horizontal axes and said second and fourth pivot means move away from one another.

7. A foldable wheelbarrow as claimed in claim 6 wherein said right and said left handle linkage and said right and said left upstanding rear wall are respectively provided with holding means for positioning and engaging said right handle linkage means with said right upstanding rear wall and said left handle means with said left upstanding rear wall at a predetermined fixed location so that said right and left handle means are spread at proper position from one another.

8. A foldable wheelbarrow as claimed in claim 7 wherein said right forward and right rear upstanding wall and wherein said left forward and left rear upstanding wall have substantially vertical edges which are complementing with said center base forward center section and said rear center section vertical edges respectively, and wherein said complementing edges are provided with flange means for achieving a multi-surface abutting and closing relationship.

* * * * *